Patented May 19, 1931

1,805,915

UNITED STATES PATENT OFFICE

LEOPOLD LASKA, RUDOLF REYHER, AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZODYESTUFFS INSOLUBLE IN WATER AND PROCESS OF MAKING SAME

No Drawing. Application filed December 11, 1928, Serial No. 325,384, and in Germany December 12, 1927.

Our present invention relates to new azo dyestuffs insoluble in water, more particularly it relates to new azodyestuffs of the following general formula:

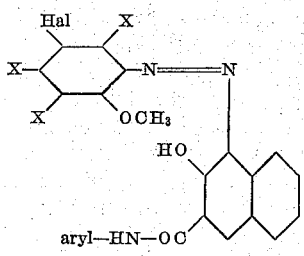

wherein one X represents halogen and the other X's stand for hydrogen.

Our new dyestuffs are obtainable by combining an arylamide of 2.3-hydroxynaphthoic acid with a diazo compound of a dihalogeno-2-anisidine of the general formula:

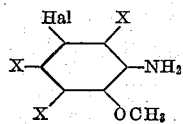

wherein one X represents halogen and the other X's stand for hydrogen.

These new products are orange to claret red dyestuffs which surpass as to their fastness especially to light the corresponding dyestuffs containing only one halogen atom in the 4 or 5 position in relation to the methoxy group.

These combinations are of particular value for producing prints according to the well known "rapide fast printing" process i. e. the printing with a mixture of a nitro-samine-alkali-salt and an arylide of the 2-hydroxy-3-naphthoic acid, since they are fast to steaming even without any addition of chromate.

They may also be employed as pigment dyestuffs and they may be produced on the fiber. Some of dyeings thus produced are distinguished by a remarkable fastness to the action of caustic soda solution.

In order to further illustrate our invention the following examples are given, the parts being by weight and all temperatures in centigrade degrees, but it may be understood that our invention is not limited to the particular products or reacting conditions mentioned therein.

Example 1

19.2 parts of 4.6-dichloro-2-anisidine are diazotized in the customary manner and this diazo solution is combined with a solution of 29.1 parts of 2-hydroxy-3-naphthoyl-4-toluidine in a caustic soda solution containing Turkey red oil and an amount of sodium acetate sufficient for binding the excess of mineral acid. The dyestuff precipitated is filtered off and well washed. It corresponds to the formula:

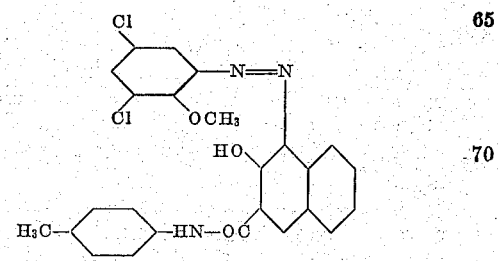

In order to prepare a lake therefrom it is advantageously applied in the form of a paste. The lakes prepared in the customary manner show clear yellowish red shades of a good fastness.

Example 2

Well boiled and dried cotton yarn is impregnated with a solution containing 9 grs. of 2-hydroxy-3-naphthoyl-2-amino-1-ethyl-benzene, 14 cc. of a caustic soda solution of 35° Bé. and 8 cc. of Turkey red oil per liter. The yarn thus treated is well wrung out and the dyestuff is developed on the fiber with a diazo solution corresponding to 3.8 grs. of 4.6-dichloro-2-anisidine per liter and nearly neutralized by means of sodium acetate. The material is then rinsed and soaped.

In this manner a bright bluish scarlet dyeing of a good fastness to kier boiling is obtained. The dyestuff thus produced on the fiber corresponds to the formula:

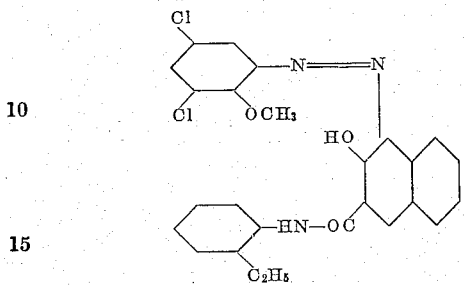

By producing the dyestuff on the fiber according to the rapide fast printing process printings are obtained which show the same shade and are fast to steaming.

*Example 3*

A printing color is prepared in the usual manner from the following ingredients:

18 parts of 2-hydroxy-3-naphthoyl-1-amino-naphthalene
60 parts of Turkey red oil
20 parts of caustic soda solution of 37° Bé.
38 parts of an aqueous paste of the nitrosamine potassium salt (prepared from 4.5-dichloro-2-anisidine for instance according to U. S. application Serial No. 240,632, filed December 16, 1927) containing 32.1% of the corresponding amine and 14.44% of caustic potash,
364 parts of water
500 parts of neutral starch tragacanth thickening.

The goods are printed with this printing paste, steamed in the Mather-Platt at 100° for about 3 minutes. After having passed a bath containing 30 cc. of acetic acid of 6° Bé. and 50 grs. of Glauber's salt per liter and warmed to 70–80°, they are rinsed, soaped and dried.

In this manner clear claret red printings of a good fastness are obtained. The dyestuff thus produced on the fiber corresponds to the formula:

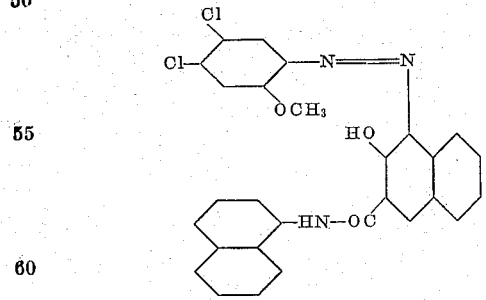

Even when the dyestuff is accompanied in printing by other colors, which want a longer steaming for fixation, it can be printed without the shade being injured.

By producing the dyestuff on cotton yarn according to the ice-color method dyeings of the same shade are obtained having a very good fastness to kier boiling.

When using instead of the salt of nitrosamine of 4.5-dichloro-2-anisidine the potassium salt of the nitrosamine of 4-chloro-5-bromo-2-anisidine and carrying out the process in the same manner as described above also a claret printing of a good fastness is obtained.

Our process may be carried out in the same way when starting from other arylides or 2-hydroxy-3-naphthoic acid. For instance the diazocompound of 4.6-dichloro-2-anisidine yields when combined with the 2-hydroxy-3-naphthoyl compound of Aniline, bright orange red shades.
2-toluidine, clear orange red shades.
2-anisidine, orange red shades.
4-chloroaniline, yellowish red shades.
5-chloro-2-anisidine, yellowish red shades.

The diazocompound of 4.5-dichloro-2-anisidine yields when combined with the 2-hydroxy-3-naphthoyl compound of 2-phenetidine, full bluish red shades.
4-phenetidine, wine red shades.
2-anisidine, claret red shades.
4-chloro-2-anisidine, wine red shades.
5-chloro-2-anisidine, bluish garnet shades.
5-chloro-2-toluidine, wine red shades.
Amino-hydroquinone-dimethylether, wine red shades.

We wish it to be understood that in the following claims the term "combining the components" comprises everywhere combining in substance or on a substrate particularly on the fiber, for instance according to the ice-color method or to one of the usual printing processes.

We claim:

1. As new compounds the azodyestuffs of the probable formula:

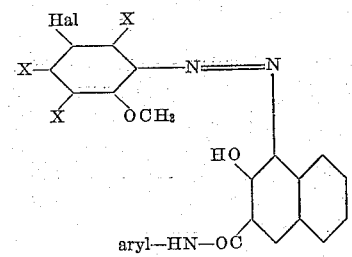

wherein one X means halogen and the other X's mean hydrogen, which compounds are when dry orange to claret red powders, insoluble in water, yielding on reduction an 1-amino-2-hydroxy-3-naphthoic acid arylide and a dihalogeno-2-anisidine of the general formula:

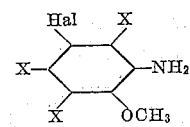

wherein X has the above signification.

2. Materials dyed or printed with the new azodyestuffs of claim 1 said dyestuffs being produced on these materials.

3. As new compounds the azodyestuffs of the probable formula:

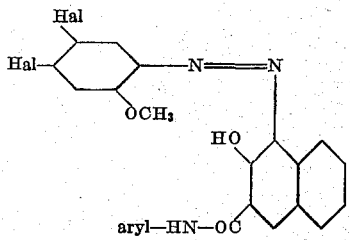

which compounds are when dry orange to claret red powders, insoluble in water, yielding on reduction an 1-amino-2-hydroxy-3-naphthoic acid arylide and a 4.5-dihalogeno-2-anisidine of the formula:

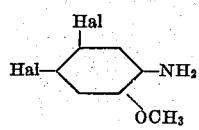

4. Materials dyed or printed with the new azodyestuffs of claim 3 said dyestuffs being produced on these materials.

5. As new compounds the azodyestuffs of the probable formula:

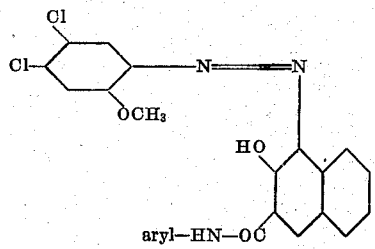

which compounds are when dry orange to claret red powders, insoluble in water, yielding on reduction an 1-amino-2-hydroxy-3-naphthoic acid arylide and 4.5-dichloro-2-anisidine of the formula:

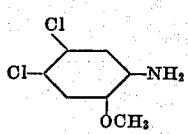

6. Materials dyed or printed with the new azodyestuffs of claim 5 said dyestuffs being produced on these materials.

7. As a new compound the dyestuff of the probable formula:

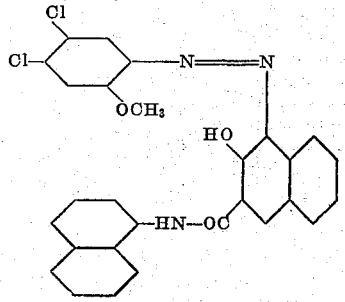

which dyestuff is when dry a claret red powder, insoluble in water, yielding on reduction 1-amino-2-hydroxy-3-naphthoic acid α-naphthalide and 4.5-dichloro-2-anisidine.

8. Materials dyed or printed with the new azodyestuff of claim 7 said dyestuff being produced on these materials.

In testimony whereof, we affix our signatures.

LEOPOLD LASKA.
RUDOLF REYHER.
ARTHUR ZITSCHER.